Figure 1A:
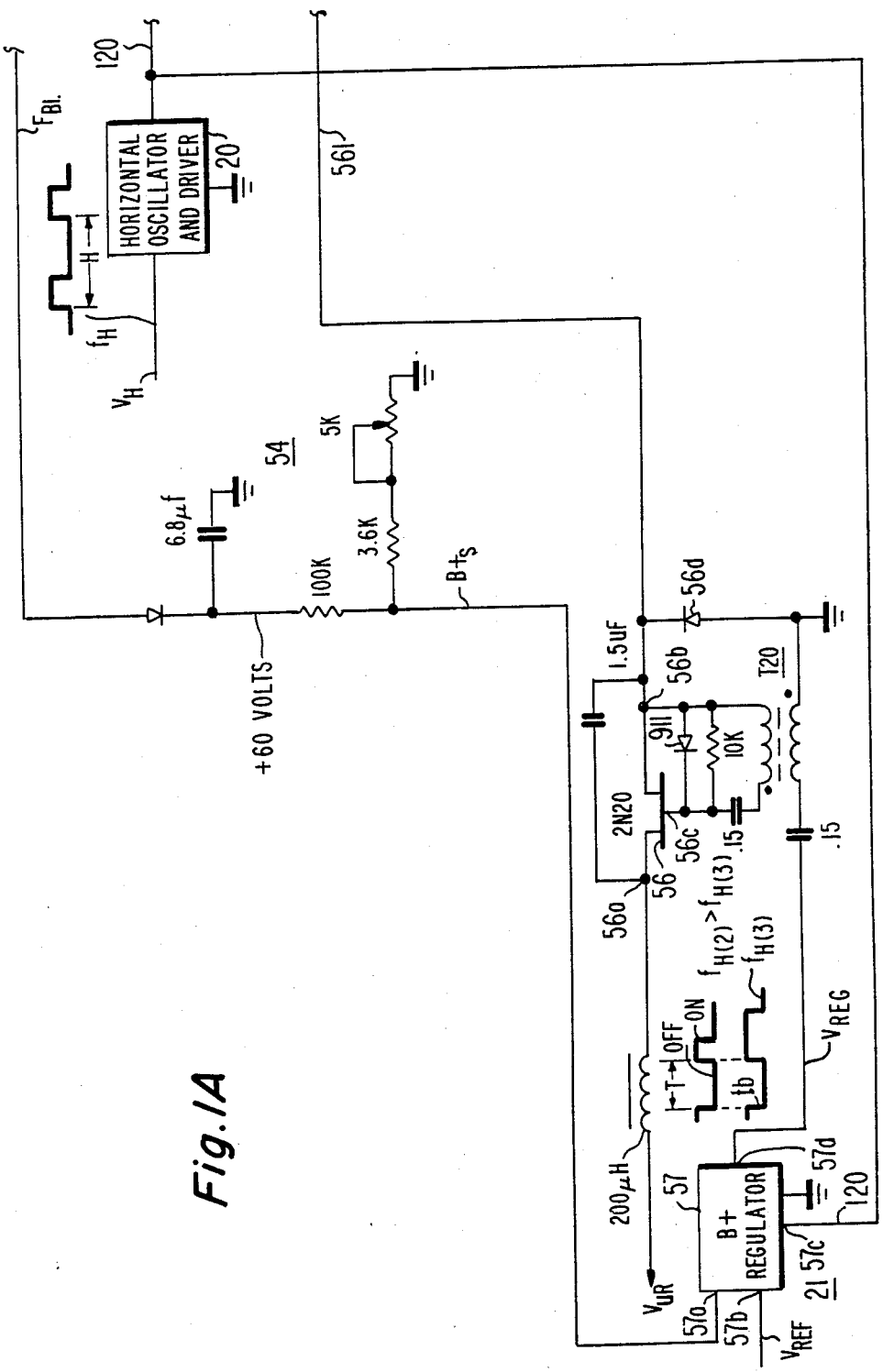

United States Patent [19]
Dietz

[11] Patent Number: 4,709,193
[45] Date of Patent: Nov. 24, 1987

[54] S-CAPACITANCE SWITCHING CIRCUIT FOR A VIDEO DISPLAY

[75] Inventor: Wolfgang F. W. Dietz, New Hope, Pa.

[73] Assignee: RCA Corporation, Princeton, N.J.

[21] Appl. No.: 868,631

[22] Filed: May 30, 1986

[51] Int. Cl.$^4$ .................................................. H01J 29/70
[52] U.S. Cl. ........................................ 315/408; 315/370
[58] Field of Search ....................................... 315/408, 370

[56] References Cited

U.S. PATENT DOCUMENTS 4,501,995  2/1985  Olmstead et al. .
4,533,855  8/1985  Willis et al. ..................... 315/370
4,536,684  8/1985  Babcock .

Primary Examiner—Theodore M. Blum
Assistant Examiner—David Cain
Attorney, Agent, or Firm—Eugene M. Whitacre; Joseph J. Laks; Sammy S. Henig

[57] ABSTRACT

A deflection circuit generates a deflection current at a scan frequency selected from any one of at least two ranges of frequencies. When the scan frequency is selected from the first range, only a first S-capacitor provides S-correction. When the scan frequency is selected from a lower second range, a series connected FET switch couples a second S-capacitor across the first S-capacitor. A DC average voltage is developed at a junction between the first and second S-capacitors. A resistor coupled to the second S-capacitor causes the second S-capacitor to be charged to the average DC voltage to prevent the average DC voltage from developing across the main current conducting electrodes of the FET switch when the FET switch is nonconductive. The FET switch is controlled by an output voltage of a comparator. The comparator is responsive to a signal that is indicative of the frequency range from which the scan frequency is selected. The comparator utilizes positive feedback to provide hysteresis that prevents switch bounce of the FET switch when the signal is in the vicinity of the threshold of the comparator.

19 Claims, 2 Drawing Figures

S-CAPACITANCE SWITCHING CIRCUIT FOR A VIDEO DISPLAY

The invention relates to a deflection circuit arrangement that includes S-correction.

In television kinescopes or picture tubes in which an electron beam is deflected by a magnetic field generated by the flow of the deflection current in a deflection winding, certain nonlinearities of the generated raster appear. One type of nonlinearity is attributable to the fact that the effective center of deflection of the electron beam is not coincident with the center of radius of curvature of the screen of the kinescope. The distance from the center of deflection to the edges of the kinescope screen is greater than the distance to the center of the kinescope screen.

As a result of this source of nonlinearity, the deflection of the electron beam as a function of time, as seen on the raster displayed on the screen of the kinescope, becomes progressively greater near the edges of the screen. Since the information to be displayed in a television system is encoded at a constant rate, the information as displayed on the screen will appear to become compressed in the center of the raster and stretched near the edges.

A common method of compensating for the nonlinearity is to place an "S", or trace, capacitor in series with the deflection winding. Typically, the S-capacitor is conductively connected to a B+ energizing voltage through an inductance having a low resistance. Thus, the average DC voltage across the S-capacitor is equal to the B+ energizing voltage. During trace, the voltage across the S-capacitor determines the rate of change of the deflection current in the deflection winding. With the addition of the S-capacitor, the deflection current, rather than being a substantially linear ramp during the recurrent scanning intervals, becomes a segment of a sinewave having a reduction in the rate of change of deflection current at the positive and negative extremes of the deflection current relative to that at the center. This in turn creates a slight reduction in the rate of scanning of the electron beam near the left and right edges of the raster relative to the center and a reduction in the stretch nonlinearity.

In a typical deflection circuit output stage, the deflection current charges the trace capacitor during one half of trace and discharges it during the other half. Consequently, the voltage across the trace capacitor varies in a parabolic manner during trace such that in the center of trace the rate of change of the voltage across the trace capacitor is zero. The extent of change of the parabolic voltage across the trace capacitor from, illustratively, the beginning of trace to the center of trace, determines the extent of S-correction provided by the trace capacitor. The capacitance of the S-capacitor is carefully chosen, taking into account the inductance of the deflection winding and the scan rate, in order to provide the desired deflection current waveform for a particular application.

In television monitors or graphic display units in which the capability of operating at any one of different scan rates from a wide range of scan frequencies is desired, the B+ energizing voltage that is conductively coupled to the S-capacitor is, typically, increased as the scan rate is increased so as to maintain the same amplitude of the deflection current. On the other hand, in a typical deflection circuit, the peak-to-peak voltage across the S-capacitor that is developed for a given amplitude of the deflection current, disadvantageously, decreases, when the scan rate increases. The voltage across the S-capacitor decreases because the impedance of the S-capacitor is inversely proportional to the scan rate. Thus, without resorting to a different approach for developing the parabolic voltage, the ratio that was discussed before will not remain the same as the scan rate changes.

The wide range of scan frequencies may be divided into several ranges of frequencies. For example, a first, or high range of frequencies may include scan frequencies above 27 KHZ and up to 38 KHZ. A second, or an intermediate range of frequencies may include scan frequencies between 20 and 27 KHz. A third, or a low range of frequencies may include scan frequencies below 20 KHZ and above 15 KHZ.

It may be desirable to vary automatically the value of the S-capacitance as the scan rate varies such that, for example, the higher is the range of frequencies from which the scan frequency is selected, the lower is the in-circuit S-capacitance that is employed. Thus, S-correction is maintained for each range of scan rates selected.

Some prior art circuits utilize a bank of mechanical relays to, for example, switch-in an additional S-capacitor for increasing the in-circuit S-capacitance when the scan frequency changes from one that is included in, for example, a given range of frequencies to one that is included in a lower one. Conversely, when the scan frequency changes from one that is included in a given range of frequencies to one that is included in a higher one, the bank of relays switches-out the additional S-capacitor to decrease the in-circuit S-capacitance. A disadvantage of using relays is that they may be bulky, require significant level of current for operation and may suffer from reliability problems. Therefore, it may be desirable to utilize semiconductor switches for switching in and out S-capacitors.

A first current conducting electrode of such semiconductor switch may be capacitively coupled via a corresponding switched S-capacitor to a first terminal of an in-circuit S-capacitor of a deflection circuit. A second current conducting electrode of the semiconductor switch may be coupled to a second terminal of the in-circuit S-capacitor. When the switch becomes conductive, the switched S-capacitor is coupled by the switch in parallel with the in-circuit S-capacitor, thus increasing the total in-circuit S-capacitance, and vice versa.

The voltage between the first and the second terminals of the in-circuit S-capacitor may as described before, include an average DC voltage such as may be equal to the B+ energizing voltage of the deflection circuit. Superimposed on the DC voltage is an AC parabolic voltage at the horizontal rate that provides S-correction. In such arrangement, when the scan frequency becomes, for example, lower than a predetermined frequency that is at the boundary between corresponding ranges of frequencies, a signal that causes the semiconductor switch to become, for example, conductive is generated. When the switch becomes conductive, it couples the switched S-capacitor in parallel with the in-circuit S-capacitor.

When the scan frequency is in the vicinity of the predetermined frequency that separates between two adjacent ranges of frequencies, a slight variation of the scan frequency during the course of receiving a video signal from a given video source may cause the state of the switch to fluctuate, or bounce, causing a corresponding discontinuous change of the in-circuit S-capacitance. Such switch bounce may be undesirable because it may cause a noticeable transient condition on the displayed picture.

In carrying out a feature of the invention, a frequency-to-voltage converter generates an output signal that is proportional to the scan frequency. A signal comparator receives a reference signal at a first input terminal and the output signal of the frequency-to-voltage converter at a second input terminal. The comparator generates a control signal at an output terminal when the difference between the signals at the first and second input terminals is at a first polarity. The control signal is coupled to a control terminal of a switch that couples an additional S-capacitor to a deflection circuit, in accordance with the level of the control signal. A positive feedback path is formed between the output terminal and one of the first and second input terminals of the comparator to provide hysteresis that prevents switch bounce from occurring when the scan frequency causes the comparator to operate in the vicinity of its threshold.

The voltage between the first and second terminals of the in-circuit S-capacitance is capacitively coupled via the switched S-capacitor to appear across the switch when the semiconductor switch is nonconductive. The associated capacitance across the switch is substantially smaller than the switched S-capacitor that is coupled in series. Therefore when the switch is nonconductive, the switched S-capacitor causes, by capacitive voltage divider action, the peak voltage between the main current conducting electrode of the switch to be, approximately, equal to the peak voltage between the first and second terminals of the in-circuit S-capacitor. Such peak voltage determines the minimum required breakdown voltage rating of the semiconductor switch and, therefore, its cost. Thus, it may be desirable to reduce the peak voltage across the semiconductor switch when the switch is nonconductive.

In carrying out another feature of the invention, a resistor is coupled to a junction between the first current conducting electrode of the switch and the corresponding plate of the switched S-capacitor. The resistor causes the switched S-capacitor to be charged to the average DC voltage that is developed across the in-circuit S-capacitor. Therefore, the superimposed AC parabolic voltage, but not the average DC voltage, appears between the main current conducting electrodes of the switch. The superimposed AC parabolic voltage is low when such resistor is used, because such voltage does not include the average DC voltage across the in-circuit S-capacitor.

Advantageously, the resistor causes the precharging of the switched S-capacitor to the average DC voltage. Therefore, immediately after the switch becomes conductive, the transient current that is required for charging the switched S-capacitor is substantially lower than when the resistor is not used. Such lower current improves the reliability of the switch.

In accordance with an aspect of the invention, a deflection apparatus that generates a deflection current in a deflection winding is capable of generating the deflection current at a frequency selected from any one of first and second ranges of scan frequencies such that S-correction is automatically provided at the selected frequency. A first S-capacitance that is coupled to the deflection winding develops, at a first terminal of the S-capacitance, a first voltage that varies in a parabolic manner, to provide the S-correction when the selected frequency is included in the first range of frequencies. A second S-capacitance has a terminal that is coupled to the first terminal. A switch coupled to a second terminal of the second S-capacitance couples the second S-capacitance to the first S-capacitance at a conductive state of the switch that occurs when the frequency is selected from the second range of frequencies to provide the S-correction and for decoupling the second S-capacitance from the first S-capacitance at a nonconductive state of the switch that occurs when the frequency is selected from the first range of frequencies, such that when the switch is at the nonconductive state, the second S-capacitance couples at least a first portion of the first voltage at the first terminal between a pair of main current conducting terminals of the switch. When the switch is at the nonconductive state, a second portion of the first voltage is developed across the second S-capacitance that reduces the magnitude of the first portion.

Figure 1B:
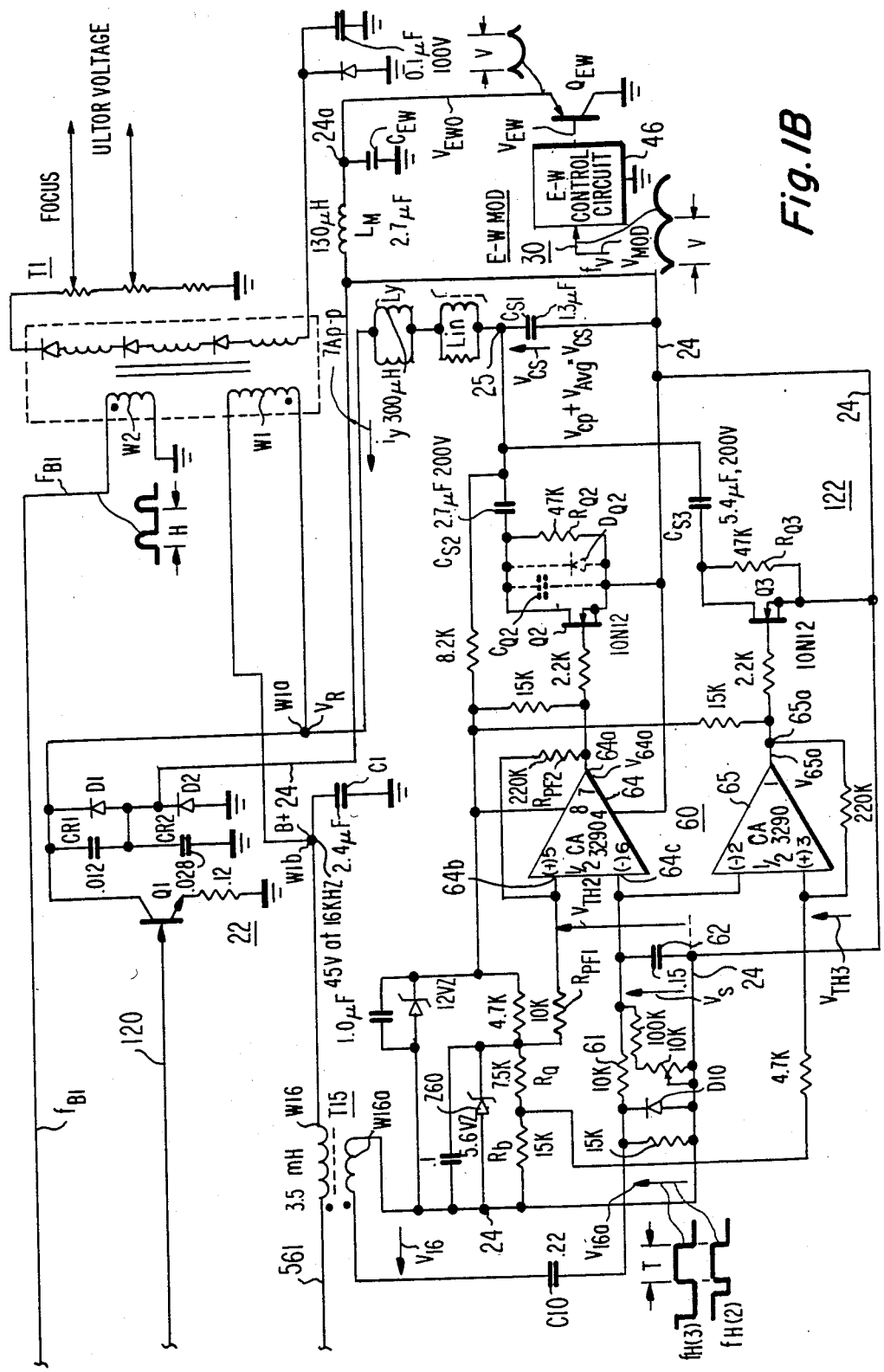

The FIGS. 1A and 1B, illustrate a horizontal deflection system, embodying the invention, that includes switched S-capacitors.

The Figures illustrate a horizontal deflection system 122 of, for example, a television monitor that includes a deflection output or generator stage 22 that is energized by an energizing voltage B+. Output stage 22 generates a generally sawtooth deflection current $i_Y$ at a deflection frequency $f_H$, the scan rate, that flows in an S, or trace, capacitor such as capacitor $C_{s1}$ during each deflection interval H.

An oscillator and driver unit 20 receives a synchronizing signal $V_H$ at horizontal frequency $f_H$ from a synchronizing signal separator, not shown, that separates horizontal synchronizing signals from an incoming video signal. Unit 20 supplies an output signal 120 at the frequency $f_H$ that is coupled to the base electrode of a transistor switch Q1. Signal 120 causes switch Q1 to conduct from a time that occurs shortly prior to the center of the horizontal trace interval until switch Q1 becomes non-conductive, for initiating the retrace interval, at the end of the horizontal trace interval. The collector of transistor switch Q1 is coupled to an end terminal W1a of a primary winding W1 of a flyback transformer T1. The other end terminal of winding W1, a terminal W1b, is coupled to a filter capacitor C1 and to energizing voltage B+.

Output stage 22 produces deflection current $i_Y$ in a horizontal deflection winding $L_y$ that is series coupled with a linearity inductor $L_{LIN}$. During the first half of trace, current $i_Y$ flows between a junction terminal 25 and terminal W1a, in a direction that is opposite to that pointed by the arrow. During the second half of trace, current $i_Y$ flows in the direction that is pointed by the arrow.

"S" shaping of the horizontal deflection current $i_Y$ is produced, at least in part, by trace capacitor $C_{s1}$ having one plate that is coupled to terminal 25. The other plate of capacitor $C_{s1}$ that is coupled to a conductor 24, is coupled to a terminal of a side pincushion modulation inductor $L_M$. One plate of a first retrace capacitor CR1 is coupled to terminal W1a of transformer winding W1. The other plate of capacitor CR1 is coupled to a plate of a second retrace capacitor CR1. The other plate of capacitor CR2 is coupled to a reference potential such as ground. A damper diode D1, coupled across the plates of retrace capacitor CR1, is poled to conduct current to terminal W1a of winding W1. A damper diode D2, coupled across the plates of retrace capacitor CR2, is poled to conduct current from the reference potential to conductor 24 that is coupled at the junction of capacitors CR1 and CR2 and also of diodes D1 and D2. Diodes D1 and D2 clamp the voltage at terminal W1a to approximately the ground reference potential during the first half of the trace interval; whereas transistor switch Q1 clamps it to approximately the ground reference potential during the second half of the trace interval.

An inside-outside pincushion correction circuit 30, that includes inductor $L_M$, is coupled to conductor 24. Circuit 20 includes a control circuit 46 having an input terminal that is coupled to an output terminal of a vertical deflection generator, that is not shown in FIG. 1, for receiving a vertical rate parabolic signal $V_{mod}$ at the frequency $f_V$, the vertical rate. Control circuit 46 generates an output signal $V_{EW}$ that is coupled to the base electrode of a transistor $Q_{EW}$ that is configured as a common collector class A amplifier. The emitter electrode of transmitter $Q_{EW}$ is coupled to a terminal 24a of inductor $L_M$. A filter capacitor $C_{EW}$ is coupled between terminal 24a and ground. A vertical rate parabolic voltage $V_{EWO}$ is developed at terminal 24a. Voltage $V_{EWO}$ provides east-west pincushion correction using the well known diode modulator technique.

Output stage 22 is capable, advantageously, of producing deflection current $i_Y$ of substantially the same predetermined amplitude for any given frequency $f_H$ of synchronizing signal $V_H$ that is selected from a wide range of frequencies. Frequency $f_H$ may be selected from three ranges of frequencies such as 15 KHZ-20 KHZ, 20 KHZ-27 KHZ and 27 KHZ-38 KHZ. Controlling the amplitude of deflection current $i_Y$ is accomplished by automatically increasing voltage B+ when the frequency $f_H$ increases, and vice versa, so as to maintain constant amplitude of deflection current $i_Y$, as described below.

Voltage B+ is controlled by a regulated supply 50, operating in a closed-loop configuration that varies voltage B+ in accordance with a signal B+$_s$. Regulated supply 50 comprises a series pass transistor switch 56 opeating with a duty cycle that is controlled by a B+ regulator circuit 57. A current conducting terminal 56a of switch 56 is coupled to an unregulated DC voltage $V_{UR}$. The other current conducting terminal, a terminal 56b, is coupled via an inductance W16 of a transformer T15 to terminal W1b. The cathode of a flywheel diode 56d is coupled to terminal 56b. The anode of diode 56d is coupled to ground. Terminal W1b is coupled to filter capacitor C1 for producing voltage B+. B+ regulator circuit 57 receives, at an input terminal 57c, a timing signal 120 at the frequency $f_H$. Regulator circuit 57 produces, at an output terminal 57d, a rectangular waveform signal $V_{REG}$ at the frequency $f_H$ that is synchronized with timing signal 120.

Consider, for the sake of explanation, the synchronized open loop operation of B+ regulator circuit 57. In the open loop operation, the duration of the "off" state of signal $V_{REG}$ is independent of the frequency $f_H$; whereas the period between consecutive cycles, is equal to the period of signal $V_H$. Thus, the duty cycle, or the ratio between the duration of the "on" state to that of the entire period, increases as the frequency $f_H$ decreases. Signal $V_{REG}$ is coupled by a transformer T20 to a control electrode 56c of switch 56. During the "off" state of signal $V_{REG}$, switch 56 is conductive. During the "on" state of signal $V_{REG}$, switch 56 is nonconductive and flywheel diode 56d is conductive. The open loop operation of B+ regulated supply 50 is such that the higher the frequency $f_H$ is, the larger is voltage B+. The increase in voltage B+ counteracts the tendency of deflection current $i_Y$ to decrease, when the frequency $f_H$ increases, for example. It should be understood that, in some applications, such open loop configuration of supply 50 may provide the required variation of voltage B+ as a function of frequency $f_H$, especially in such monitor applications in which frequency $f_H$ varies within a narrow range of frequencies.

In the closed-loop operation that is employed in the circuit of FIG. 1, B+ regulator circuit 57 receives an, illustratively, DC constant reference signal $V_{REF}$ at a terminal 57b and signal B+$_s$ at a terminal 57a that is indicative of the amplitude of deflection current $i_Y$. Regulator circuit 57 varies the duty cycle of signal $V_{REG}$ by varying the duration of the "ON" state of signal $V_{REG}$, in accordance with the difference between signals $V_{REF}$ and B+$_s$, to obtain a corresponding variation in voltage B+ that maintains deflection current $i_Y$ at substantially the same amplitude when the frequency $f_H$ changes. A peak detector 59 generates signal B+$_s$ that is indicative of the positive peak of signal $F_{B1}$. Signal $F_{B1}$ is developed across winding W2 of transformer T1. The positive peak of signal $F_{B1}$, that occurs at the center of retrace, is indicative of the amplitude of deflection current $i_Y$.

As described later on in detail, a switching circuit 60 switches-in none, one or both of trace capacitors $C_{s2}$ and $C_{s3}$ in parallel with trace capacitor $C_{s1}$ as a function of the range of frequencies from which the scan frequency is selected. For the high end of the range of scan frequencies such as over 27 KHZ, only capacitor $C_{s1}$ provides the in-circuit trace capacitance. Between 20–27 KHZ, capacitor $C_{s2}$ is coupled via an FET switch Q2 across capacitor $C_{s1}$ such that the in-circuit trace capacitance is equal to the sum of both. Below 20 KHZ, capacitor $C_{s3}$ is coupled via an FET switch Q3 across capacitors $C_{s1}$ and $C_{s2}$ such that the in-circuit trace capacitance is equal to the sum of the three capacitors. Circuit 60 and the voltages associated with it are reference to conductor 24.

The impedance between the current conducting electrodes of FET switch Q2, for example, when switch Q2 is nonconductive, can be represented by an equivalent circuit of a small capacitance $C_{Q2}$ and a diode $D_{Q2}$ that is constructed integrally with FET switch Q2.

Assume that only the impedance of switch Q2 is coupled in series with capacitor $C_{s2}$ such that a resistor $R_{Q2}$ that is coupled between the main current conducting electrodes of switch Q2 is removed and also assume that switch Q2 in in the nonconductive state. Voltage $V_{cs}$ across capacitor $C_{s1}$, that is between terminal 25 and conductor 24, is coupled via capacitor $C_{s2}$ across capacitance $C_{Q2}$. Capacitance $C_{Q2}$ is substantially smaller than capacitor $C_{s2}$. As a result of capacitive voltage divider action, the greater portion of voltage $V_{cs}$ appears between the main current conducting electrodes of switch Q2. Voltage $V_{cs}$ includes an AC parabolic voltage, $V_{cp}$, superimposed on an average DC voltage, $V_{avg}$, that is coupled from the source of voltage B+. It may be desirable to reduce the voltage between the main current conducting electrodes of switch Q2 such that a transistor with a low breakdown voltage rating, and hence low cost, can be used to perform the function switch Q2.

In accordance with an aspect of the invention, resistor $R_{Q2}$ that is coupled between the main current conducting electrodes of switch Q2 causes capacitor $C_{s2}$ to be charged to the average DC voltage of voltage $V_{cs}$. Consequently, when switch Q2 is nonconductive, parabolic voltage $V_{cp}$, but not the average DC voltage of voltage $V_{cs}$, appears across the main current conducting electrodes of switch Q2. Because the peak-to-peak amplitude of voltage $V_{cp}$ is substantially smaller than the peak of voltage $V_{cs}$, the required breakdown voltage rating of FET switch Q2 when resistor $R_{Q2}$ is used, is, advantageously, substantially smaller than if resistor $R_{Q2}$ were not used. Diode $D_{Q2}$ and capacitor $C_{s2}$ cause the peak voltage across the main current conducting electrodes of switch Q2 to be equal to the value of the peak-to-peak amplitude of voltage $V_{cp}$. Switch Q3 and an associated resistor $R_{Q3}$ operate in a similar manner to switch Q2 and resistor $R_{Q2}$, respectively.

The gate electrode of FET switch Q2 is controlled by an output voltage $V_{64a}$ at an output terminal 64a of a voltage amplifier, or switching comparator 64. Similarly, the gate electrode of FET switch Q3 is controlled by a voltage at a terminal 65a of a comparator 65. Comparator 64, for example, has a noninverting input terminal 64b. A voltage $V_{TH2}$, developed at noninverting terminal 64b determines the threshold switching voltage of comparator 64. Voltage $V_{TH2}$ is measured between terminal 64b and conductor 24 and is partly formed by a constant DC voltage across a zener diode Z60 that is referenced to conductor 24 and that is coupled via a resistor $R_{PF1}$ to terminal 64b.

In accordance with another aspect of the invention, output voltage $V_{64a}$ of comparator 64 is coupled, via a resistor $R_{PF2}$ that provides a positive feedback signal path, to terminal 64b. Thus, both the voltage across zener diode Z60 and voltage $V_{64a}$ determine the magnitude of voltage $V_{TH2}$.

When a voltage $V_s$ at an inverting input terminal 64c is higher than voltage $V_{TH2}$, output voltage $V_{64a}$ of comparator 64 is approximately zero relative to conductor 24. The result is that switch Q2 becomes nonconductive. As described later on, when the scan frequency, for example, decreases, voltage $V_s$ proportionately decreases. When voltage $V_s$ at inverting input terminal 64c is slightly lower than threshold voltage $V_{TH2}$, output voltage $V_{64a}$ of comparator 64 becomes positive and large relative to each of the main current conducting electrodes of FET switch Q2, thus causing switch Q2 to be conductive.

In carrying out another aspect of the invention, the now positive large voltage $V_{64a}$ increases voltage $V_{TH2}$ relative to its level when voltage $V_{64a}$ is zero. Such increase causes voltage $V_{TH2}$ to become more positive by an amount that is related to the resistances of resistors $R_{PF1}$ and $R_{PF2}$. The positive feedback provides hystersis which prevents oscillation when voltage $V_s$ is close to threshold voltage $V_{TH2}$. When voltage $V_s$ is lower than voltage $V_{TH2}$, it causes voltage $V_{64a}$ to be positive and large. The positive feedback increases voltage $V_{TH2}$, thus causing an increase in the threshold voltage $V_{TH2}$ of comparator 64. In order to cause voltage $V_{64a}$ to be zero again, voltage $V_s$ has to be lower than voltage $V_s$ that caused voltage $V_{64a}$ to become positive. It follows that the positive feedback prevents small perturbations in voltage $V_s$ at the vicinity of theshold voltage $V_{TH2}$ from causing corresponding oscillations of voltage $V_{64a}$. If permitted to occur, oscillations of voltage $V_{64a}$ can cause an undesirable bounce of switching signal $V_{64a}$ and of transistor Q2, resulting in alternately coupling to, and decoupling from circuit 22 of an impedance such as, for example, capacitor $C_{s2}$.

Comparator 65 operates similarly to comparator 64 except that the corresponding threshold voltage $V_{TH3}$ is lower because of the voltage dividing operation of resistors $R_a$ and $R_b$ that couple a portion of the voltage across zener diode Z60 to the corresponding noninverting input terminal of comparator 65. Therefore, comparator 65 causes FET switch Q3 to become conductive at a level of voltage $V_s$ that is lower than the level that causes FET switch Q2 to become conductive.

As described in detail below, voltage $V_s$ is a control signal that varies and is proportional to the scan frequency $f_H$. The higher the scan frequency is, the more positive is voltage $V_s$. When the scan frequency is over 27 KHZ, voltage $V_s$ is higher than each of voltages $V_{TH2}$ and $V_{TH3}$; therefore, none of switches Q2 and Q3 is conductive and only capacitor $C_{s1}$ provides the in-circuit trace capacitance. When the scan frequency is over 20 KHZ but under 27 KHZ, voltage $V_s$ is lower than voltage $V_{TH2}$; therefore, switch Q2 is conductive and the sum of capacitors $C_{s1}$ and $C_{s2}$ provides the in-circuit trace capacitance. When the scan frequency is lower than 20 KHZ, voltage $V_s$ is lower than each of voltages $V_{TH2}$ and $V_{TH3}$; therefore, both switches Q2 and Q3 are conductive and the sum of capacitors $C_{s1}$, $C_{s2}$ and $C_{s3}$ provides the in-circuit trace capacitance.

An AC voltage $V_{16}$ across a secondary winding W16a of transformer T15 is developed across a clamping arrangement of a clamping diode D10 and a capacitor C10 that are coupled in series. Diode D10 and capacitor C10 cause a voltage $V_{16a}$ to develop across diode D10. Voltage $V_{16a}$ has the same peak-to-peak amplitude as voltage $V_{16}$. However, voltage $V_{16a}$ is clamped to approximately zero volts when voltage $V_{16}$ is the most negative. During the rest of the cycle voltage $V_{16a}$ is positive.

The peak-to-peak amplitude of a voltage $V_{16}$ across a secondary winding W16a of transformer T15 is the same for each scan frequency. However, the ratio between the duration of the positive portion of voltage $V_{16}$ and that of the negative portion, or the duty cycle, increases as the scan frequency increases. When voltage $V_{REG}$ is at the "off" state, switch 56 that is conductive, causes the formation of the positive portion of voltage $V_{16}$ by coupling voltage $V_{UR}$ to winding W16. When voltage $V_{REG}$ is at the "ON" state, switch 56 is nonconductive; however, diode 56d that is conductive, causing the formation of the negative portion of voltage $V_{16}$ by coupling the ground potential to winding W16. Voltage $V_{16a}$ across winding $W_{16a}$ has a waveform that follows that of voltage $V_{16}$. The duration of the positive portion of voltage $V_{16}$ relative to the scan period increases when the scan rate increases. It follows that the positive average DC voltage of voltage $V_{16a}$ increases when the scan frequency increases. The AC component part of voltage $V_{16a}$ is filtered out by a lowpass filter that includes a resistor 61 and a capacitor 62. The result is that DC voltage $V_s$ across capacitor 62 that is referenced to conductor 24 becomes more positive when the scan frequency increases. Thus, the arrangement of transformer T15, capacitor C10 and diode D10 operates as a frequency-to-voltage converter to generate voltage $V_s$ that is directly proportional to the scan frequency.

Control signal $V_s$ is coupled to switching comparators 64 and 65 to generate the frequency range indicative switching signals $V_{64a}$ and $V_{65a}$. These switching signals are coupled to deflection generator 22 to control deflection generator operation in accordance with the scan frequency of input signal $V_H$. Although switching signals $V_{64a}$ and $V_{65a}$ are coupled to FET transistors Q2 and Q3 of deflection generator 22 to control S-shaping, the switching signals may control other aspects of deflection generator operation, such as horizontal oscillator RC time constant elements.

Thus, horizontal deflection system 122, that generates deflection current $i_Y$, is, advantageously S-corrected over a wide range of frequencies, using MOS FET type transistors for automatically switching S-capacitors $C_{s2}$ and $C_{s3}$, respectively in accordance with the corresponding scan rate that is selected. Advantageously, switching the S-capacitors may be obtained using transistors with low voltage rating. Additionally by introducing hysteresis, switch bounce is, advantageously, substantially eliminated.

What is claimed:

1. A deflection apparatus for generating a deflection current in a deflection winding, said apparatus being capable of generating said deflection current at a frequency selected from any one of first and second ranges of scan frequencies such that S-correction is provided at the selected frequency, comprising:
 a source of an input signal at a frequency that is related to the selected frequency;
 a source of energizing voltage;
 switching means responsive to said input signal and coupled to said deflection winding for producing said deflection current at the selected frequency in accordance with said energizing voltage;
 a first S-capacitance that is coupled to said deflection winding for developing a first voltage that varies in a parabolic manner to provide the S-correction when the selected frequency is included in said first range of frequencies;
 a second S-capacitance having a first terminal that is coupled to said first S-capacitance and to said energizing voltage such that a first DC voltage is developed at said first terminal;
 a second switch coupled to a second terminal of said second S-capacitance for coupling said second S-capacitance to said first S-capacitance through a pair of main current conducting terminals of the second switch at a conductive state of said second switch that occurs when said frequency is selected from said second range of frequencies and for decoupling said second S-capacitance from said first S-capacitance at a nonconductive state of said second switch that occurs when said frequency is selected from said first range of frequencies, such that when said second switch is at said nonconductive state, said first DC voltage is developed at said first terminal; and
 means coupled at a junction between one terminal of said pair of main current conducting terminals and said second terminal of said second S-capacitance for developing across said second S-capacitance, when said second switch is at said nonconductive state, a second DC voltage at a magnitude that substantially prevents said second S-capacitance from capacitively coupling said first DC voltage to said one terminal of said second switch.

2. An apparatus according to claim 1 wherein a capacitance developed between said pair of terminals of said second switch and said second S-capacitance form a capacitive DC voltage divider that is responsive to said first DC voltage and wherein said means that develops said second DC voltage prevents said capacitive voltage divider from capacitively coupling said first DC voltage to said second switch.

3. An apparatus according to claim 1 wherein said means that develops said second DC voltage comprises a resistor that is coupled at said junction between said second terminal of said second S-capacitance and said second switch.

4. An apparatus according to claim 3 wherein said resistor has a second terminal that is coupled to one of said pair of current conducting electrodes that is remote from said junction between said second terminal of said S-capacitance and said second switch.

5. An apparatus according to claim 1 wherein said second switch comprises a transistor.

6. An apparatus according to claim 5 wherein said means that develops said second DC voltage comprises a resistor paralleling said pair of current conducting electrodes.

7. An apparatus according to claim 5 wherein said transistor comprises an MOS transistor.

8. A deflection apparatus for generating a deflection current in a deflection winding, said apparatus being capable of generating said deflection current at any frequency selected from any one of first and second ranges of scan frequencies such that S-correction is automatically provided at the selected frequency, comprising:
 a source of an input signal at a frequency that is related to the selected frequency;
 switching means responsive to said input signal and coupled to said deflection winding for producing said deflection current at the selected frequency;
 a first S-capacitance for developing a parabolic voltage that is coupled to said deflection winding;
 a second S-capacitance;
 a second switch coupled to said second S-capacitance and to said deflection winding for coupling said second S-capacitance to said deflection winding at a first state of said second switch that occurs when said frequency is selected from said first range of frequencies, such that both said first and second S-capacitances provide S-correction, and for decoupling said second S-capacitance from said deflection winding at a second state of said second switch that occurs when said frequency is selected from said second range of frequencies, such that said first S-capacitance but not said second S-capacitance provides S-correction;
 means responsive to said input signal for generating a first control signal that varies in accordance with the selected frequency;
 means responsive to said first control signal for generating a second control signal that is coupled to said second switch to control the switching thereof in accordance with the selected frequency; and
 means coupled to said second control signal generating means for providing hysteresis to the switching of said second switch.

9. An apparatus according to claim 8 wherein said second control signal generating means comprises an amplifier having a first input terminal that is coupled to said first control signal generating means for generating from a signal at an output terminal of said amplifier said second control signal in accordance with the signal at said first input terminal.

10. An apparatus according to claim 9 further comprising a source of a reference signal that is coupled to a second input terminal of said amplifier such that said second control signal is determined in accordance with said first control and reference signals.

11. An apparatus according to claim 10 wherein said amplifier comprises a comparator that generates said second control signal in accordance with the difference between said first control and reference signals.

12. An apparatus according to claim 9 wherein said hysteresis producing means is responsive to the signal at said output terminal for providing a positive feedback signal path that is coupled to said amplifier.

13. An apparatus according to claim 8 further comprising a source responsive to said input signal for producing a signal having a duty cycle that varies in accordance with the selected frequency wherein said first control signal generating means is responsive to said variable duty cycle signal for generating said first control signal in accordance with the duty cycle of said variable duty cycle signal.

14. An apparatus according to claim 13 further comprising a transformer having a first winding that is coupled to said source of said variable duty cycle signal for producing in a second winding of said transformer an AC signal having a duty cycle that varies in accordance with the duty cycle of said variable duty cycle signal wherein said first control signal generating means comprises a clamping arrangement responsive to said AC signal that generates said first control signal in accordance with the duty cycle of said AC signal.

15. A deflection apparatus for generating a deflection current in a deflection winding, said apparatus being capable of generating said deflection current at any frequency selected from any one of first and second ranges of scan frequencies, comprising:
a source of an input signal at a frequency that is related to the selected frequency;
switching means responsive to said input signal and coupled to said deflection winding for producing said deflection current at the selected frequency;
an impedance;
a second switch coupled to said impedance and to said deflection winding for coupling said impedance to said deflection winding at a first state of said second switch to provide raster distortion correction when said frequency is selected from said first range of frequencies and for decoupling said impedance from said deflection winding at a second state of said second switch to provide raster distortion correction when said frequency is selected from said second range of frequencies;
means responsive to said input signal for generating a first control signal that varies in accordance with the selected frequency;
means responsive to said first control signal for generating a second control signal that is coupled to said second switch to control the switching thereof in accordance with the selected frequency; and
means coupled to said second control signal generating means for providing hysteresis to the switching of said second switch.

16. An apparatus according to claim 15 that automatically provides S-correction at the selected frequency further comprising a first S-capacitance for developing a parabolic voltage that is coupled to said deflection winding to provide S-correction, wherein said impedance comprises a second S-capacitance, wherein both said first and second S-capacitance provide S-correction at said first state of said second switch and wherein said switch decouples said second S-capacitance from said deflection winding at said second state of said second switch.

17. A deflection apparatus for generating a deflection current in a deflection winding, said apparatus being capable of generating said deflection current at a frequency selected from any one of first and second ranges of scan frequencies such that S-correction is automatically provided at the selected frequency; comprising:
a source of an input signal at a frequency that is related to the selected frequency;
a source of energizing voltage;
switching means responsive to said input signal and coupled to said deflection winding for producing said deflection current at the selected frequency in accordance with said energizing voltage;
a first S-capacitance that is coupled to said deflection winding for developing a first voltage that varies in a parabolic manner having an average DC value to provide the S-correction when the selected frequency is included in said first range of frequencies;
a second S-capacitance coupled to said first voltage;
a second switch coupled to said second S-capacitance for coupling said second S-capacitance to said first S-capacitance at a first state of said second switch that occurs when said frequency is selected from said second range of frequencies to provide the S-correction and for decoupling said second S-capacitance from said first S-capacitance at a second state of said second switch that occurs when said frequency is selected from said first range of frequencies; and
a resistor coupled across a pair of main current conducting terminals of said second switch that prevents said average DC value of said first voltage from being developed across said pair of main conducting terminals of said second switch when said second switch is at said second state.

18. A deflection apparatus for generating a deflection current in a deflection winding, said apparatus being capable of generating said deflection current at any frequency selected from any one of first and second ranges of scan frequencies, comprising:
a source of an input signal at a frequency that is related to the selected frequency;
a deflection generator responsive to said input signal and coupled to said deflection winding for producing said deflection current at the selected frequency;
means responsive to said input signal for generating a control signal that varies in accordance with the selected frequency;
switching means coupled to said deflection generator and responsive to said control signal for generating a frequency range indicative switching signal having a first state when said selected frequency is selected from said first range of frequencies and having a second state when said selected frequency is selected from said second range of frequencies, said switching signal being coupled to said deflection generator to control the operation thereof in accordance with the selected frequency; and
means coupled to said switching means for providing hysteresis to the switching thereof to avoid switching signal bounce.

19. An apparatus according to claim 1 further comprising, a frequency-to-voltage converter that generates a signal that is representative of the selected frequency that is coupled to a control terminal of said second switch to provide the S-correction automatically.

* * * * *